Patented Nov. 14, 1950

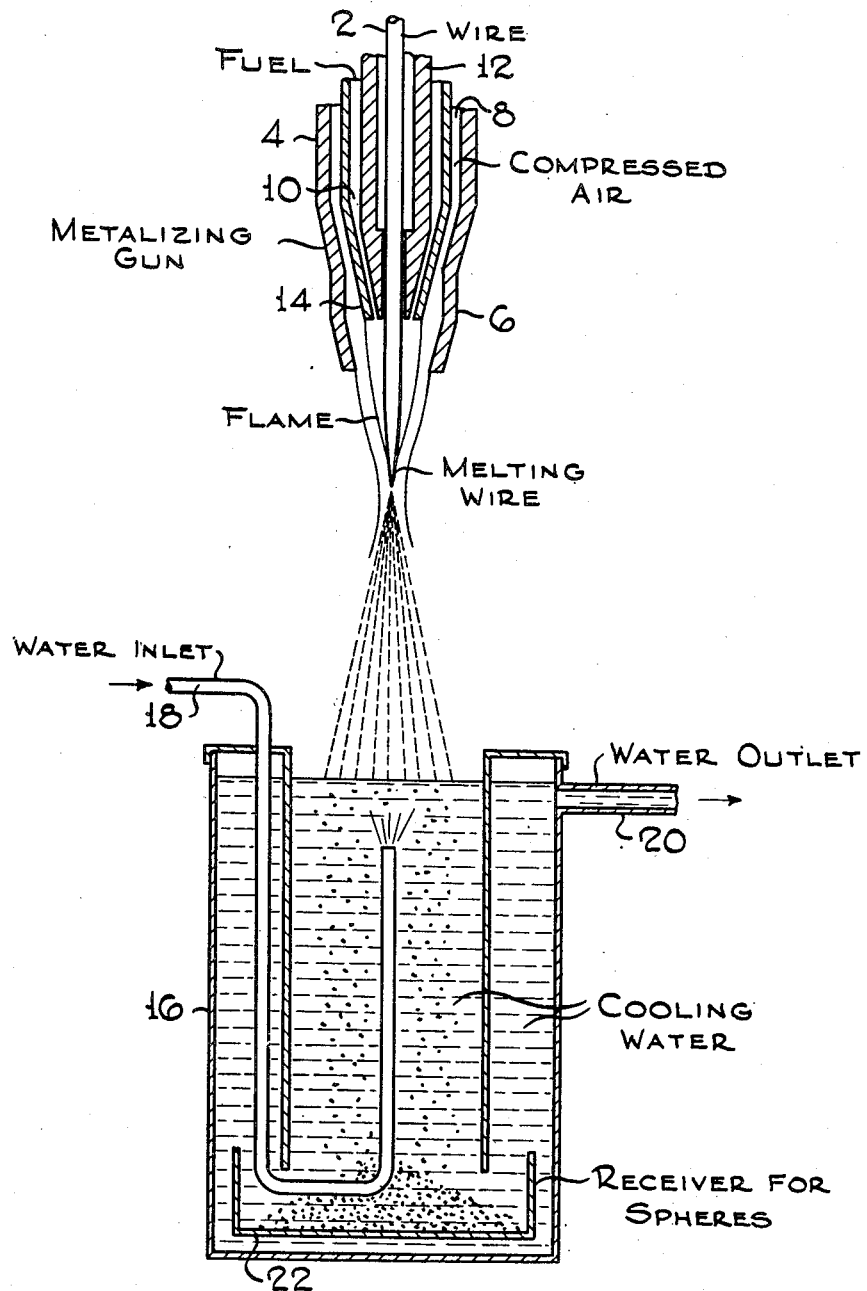

2,530,345

UNITED STATES PATENT OFFICE 2,530,345

PREPARATION OF A SPHEROIDAL FISCHER-TROPSCH CATALYST

Rhea N. Watts, Baton Rouge, La., assignor to Standard Oil Development Company, a corporation of Delaware Application September 30, 1948, Serial No. 51,987

10 Claims. (Cl. 252—443)

The present invention is concerned with an improved process for the preparation of catalysts comprising iron microspheres. The invention is more specifically concerned with an improved iron catalyst adapted for promoting the synthesis of hydrocarbons containing more than one carbon atom in the molecule from feed gases comprising carbon monoxide and hydrogen.

In an abandoned copending application Ser. No. 738,915 filed April 2, 1947 entitled "Hydrocarbon Synthesis Catalyst" of which the present application is a continuation-in-part there is described a method for preparing iron microspheres from iron wire employing a metallizing gun.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel.

The temperatures employed in the synthesis reaction vary widely, as for example, in the range from about 300° F. to about 800° F. and are generally in the range from about 350° F. to about 750° F. The pressures, likewise vary considerably and are a function of other operating conditions, such as catalyst employed, activity of the catalyst, character of the feed gases and the temperature utilized. Pressures in the range from about 1 to 100 and higher atmospheres have been suggested. Satisfactory pressures are in the range from about 50 pounds to 750 pounds per square inch. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, the mol ratio of hydrogen to carbon monoxide in the range from about 1/1 to 4/1 is desirable.

The synthesis gases comprising hydrogen and carbon monoxide are produced by various procedures. Methane or natural gas may be converted to CO and $H_2$ in the presence of a reducible metal oxide, with pure oxygen or by reforming with gases such as steam, $CO_2$, or a mixture thereof. Other sources of CO and $H_2$ are coal, shale and other solid hydrocarbons which may be treated with steam at elevated temperatures. The reaction may be conducted in a single or in a plurality of stages. For example, one procedure is to reform methane using steam, methane and carbon dioxide and a nickel catalyst for the production of carbon monoxide and hydrogen. When employing methane as feed gas and oxidizing the same with a reducible metal oxide, the reactions are generally conducted at temperatures in the range from about 1400° F. to about 2000° F. When the synthesis gases are produced, by utilizing oxygen and natural gas, the temperatures in the synthesis gas producing zone are usually in the range from about 2000° F. to about 3000° F.

It has, heretofore, been known in the art to contact gases and solids by passing the gases upwardly through an enlarged treating zone, containing a body of finely divided solids to be contacted, at a controlled gas velocity to maintain the solids in the treating zone in quasi-liquid or fluidized state. Under properly controlled conditions, the subdivided solid particles are not only maintained in a highly turbulent, quasi-liquid and ebullient state, but there exists a rapid and uniform circulation of the fluidized solids throughout the fluid bed.

Processes of this character, wherein fluidized solids are contacted with gases, have a number in inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible readily to add or extract heat from the mass at an extremely rapid rate. In these fluidized reactions the small subdivided solids or catalysts usually have a particle size in the range from about 1 to 200 microns and higher. These particles are suspended in a fluid ebullient state by means of the upflowing suspending gases, the superficial velocity (i. e. assuming no catalyst in reactor) of which varies in the general range from about 0.1 to 5 feet per second.

The invention is primarily concerned with the production of catalysts comprising iron spheres. The iron spheres of the process are characterized by having an iron core and an oxidized surface. The catalysts are particularly desirable for employment in hydrocarbon synthesis processes in view of the fact that one problem and difficulty in synthesis operations is that the catalyst disintegrates due to the formation of excessive carbon on the catalyst. Apparently carbon forms throughout the area of the catalyst particles causing it to fragmentate. It has been discovered that, provided the catalyst particles comprise an iron core and an oxidized surface, the extent of the disintegration is restricted to the thickness of the oxidized surface. As hereinafter described the extent and depth to which the surface skin is oxidized is limited by controlling the extent to which the molten iron particles are passed through air. The extent and depth to which the iron is oxidized on the surface of the particles can be controlled by employing an atmosphere in which the oxygen concentration is controlled. For example, an atmosphere of nitrogen and oxygen can be adjusted so that a concentration below about 20% as for example, in the range from about 5 to 15% oxygen may be formed and the depth of the oxide film on the iron spheres issuing from the gun thus controlled by passage through such an atmosphere. On the other hand, it is within the concept of the invention to utilize an atmosphere in which the oxygen concentration is well above about 20% as for example, in the range from about 30% to 60% and higher. A few simple tests will determine the concentration of oxygen necessary to form an oxide film of desired thickness on the iron microspheres.

The catalyst particles of the invention are produced by using relatively pure iron wire as for example iron wire which contains less than about 0.2% carbon and a metallizing gun. Any suitable metallizing gun may be employed.

Iron catalyst in order to be effective in hydrocarbon synthesis require a promoter. Usually an alkali metal salt, oxide or hydroxide, in amounts of from 1 to 5 weight per cent based on the iron, is utilized as the promoter or activator. In accordance with the present invention the catalyst in the form of small spheres is obtained by causing iron wire to pass through a device known as a metallizing gun and the promoter is incorporated into or associated with, the iron particles thus formed, either by precoating the wire prior to passage through the said gun or passing an uncoated iron wire through the gun and quenching the molten particles issuing from the gun in a solution containing the promoter whereby the iron spheres acquire the said activator in promotional amounts. In the accompanying drawing there is shown diagrammatically a metallizing gun.

Referring in detail to the drawing, iron wire 2, either precoated with a suitable promoter as described hereinafter, or without promoter addition, is driven through metallizing gun 4 by a compressed air-operated turbine. The air may be diluted with an inert gas such as nitrogen to obtain the desired oxygen content in the compressed air. Oxygen and a suitable fuel, such as propane or acetylene, are admitted to the gun and admixed therein and are introduced through air cap 6. In the diagram, compressed air is shown passing through passage 8, fuel gas through passage 10, and the wire fed through 12.

The fuel mixture is ignited and burns at the end of wire nozzle 14 as indicated. The compressed air exhausted from the turbine blows against the melting wire to form an atomized spray of iron particles, which are allowed to impinge upon cooling water, the surface of which is at such distance from nozzle 14 to allow the desired oxide coating to form on the atomized particles. One form of such quenching device is represented in the diagram. Cooling water with or without dissolved promoter is maintained in vessel 16, water being, if desired, continuously admitted through inlet 18 and withdrawn through outlet 20. At the bottom of 16 there is preferably a receiver 22 for receiving the catalyst sprayed overhead from metallizing gun 4.

Using the particular metallizing gun described above, a reducing (with respect to the iron) atmosphere exists in front of the gun for approximately a distance of 6 inches. Thus when the metal is impinged upon a cold surface or quenched in a liquid within this distance substantially no oxidized metal is deposited upon this surface. When the travel path of the metal particles is extended beyond the six inch limit, the extent to which the metal is oxidized is a function of the distance of its travel path beyond the reducing atmosphere. As pointed out heretofore, the operation may be conducted in an atmosphere in which the extent of the oxygen concentration is predetermined. The distance then becomes a function of the oxygen concentration of the atmosphere in which the operation is conducted.

The invention may be readily understood by the following examples illustrating embodiments of the same.

Example I

Commercial spray iron wire was sprayed with a metallizing gun, using oxygen and acetylene as fuel, into water containing 6 pounds of $K_2CO_3$ per 40 pounds of water, from a distance of about three feet, at an angle of approximately 30°. The oxygen pressure was 23 pounds per square inch and that of the acetylene, 15 pounds per square inch. The resulting spheres were collected, dried and screened through a 100 mesh screen. The yield was 95%. Analytical data on the spheres were:

| | Weight per cent |
|---|---|
| Oxygen content by analysis | 10 |
| Total iron as Fe | 90 |
| Promoter as $K_2O$ (based on Fe) | 0.4 |

The spheres consisted of approximately 74% $Fe_3O_4$ and 26% Fe.

Measurements of these spheres and the oxide surface coatings were:

| Diameter of Sphere | Thickness of Oxide Coating |
|---|---|
| Microns | Microns |
| 80 | 12 |
| 90 | 10 |
| 100 | 12 |
| 100 | 20 |
| 110 | 20 |
| 120 | 10 |
| 130 | 15 |

Spheres of the order of 40 microns in diameter had coatings about 15 microns in thickness. Spheres 20 microns in diameter were wholly oxidized.

A Roller analysis of the spheres was as follows:

| Microns | Per cent |
|---|---|
| 0–20 | 1 |
| 20–40 | 7 |
| 40–80 | 26 |
| 80+ | 66 |

Approximately 75% of the spheres were solid. The remainder were hollow or irregular.

Example II

Microspheres were prepared by spraying iron wire coated with $K_2CO_3$ in the form of a paste from a metallizing gun into water from a distance of 20 inches. The amount of $K_2CO_3$ used was such as to incorporate about 0.5% potassium as $K_2O$ on the formed spheres.

*Example III*

The catalyst prepared according to Example I was tested in a fluidized hydrocarbon synthesis run to determine its activity and resistance to fragmentation, with the results below.

Temp. in reaction zone, 650° F.
Pres. in reaction zone, 400 lbs./sq. in. gauge
Gas feed rate (vols. of total feed per vol. of charged catalyst per hr.), 1515 SCF
$H_2$ to CO ratio in total feed, 2.1 to 1
CO conversion, 98.4%
$CO+H_2$ conversion, 98.3%
Yield, cc. of $C_4+$ material per cu. meter of $(H_2+CO)$ converted, 199

At the end of the test (131 hours) it was noted that the catalyst iron core had not undergone fragmentation although the spheres had to a certain extent, swelled and/or agglomerated. The swelling occurred in the oxide coating however, and the swollen coatings underwent some disintegration but there was no disintegration of the solid iron cores. During the swelling of the coating the solid iron cores became activated on their surfaces resulting in solid catalytic spheres which were not subject to disintegration but which did exhibit normal activity and selectivity even when substantially all of the coatings had been removed mechanically.

*Example IV*

The microspheres were promoted with $K_2CO_3$ by adding 17.3 g. of $K_2CO_3.1\frac{1}{2} H_2O$ dissolved in 20 ml. of hot water to 438.5 g. of spheres. The catalyst was dried and utilized in a hydrocarbon synthesis operation with the following results:

|  | Iron Microspheres (Fixed Bed) (Oxidized 74%) 2.5% $K_2CO_3$ | | | |
|---|---|---|---|---|
| Operation | A | B | C | D |
| Temperature, °F | 600 | 600 | 600 | 600 |
| Feed, $H_2/CO$ Ratio | 1.17 | 1.17 | 1.17 | 1.17 |
| Yields, collected: | | | | |
| *Oil, cc/m³ $H_2+CO$ consumed | 94 | 112 | 121 | 131 |

*Cc. hydrocarbon of butane and higher boiling constituents.

*Example V*

Microspheres were prepared by spraying iron wire (as in Example IV) into water from a distance of 20 inches. The product was screened through an 80 mesh screen. The yield was 95%. Analysis of the microspheres showed 16.6% oxygen. This decrease in oxygen content is the result of spraying the iron through a shorter distance before allowing it to hit the water. On a weight basis the microspheres were about 60% $Fe_3O_4$. Examination of mounted microspheres metallographically revealed solid iron cores with iron oxide coatings varying from 3 to 10 microns. An analysis of the spheres was as follows:

| Microns | Per cent |
|---|---|
| 0–20 | 3 |
| 20–40 | 10 |
| 40–80 | 28 |
| 80+ | 59 |

These spheres were employed in a hydrocarbon synthesis process with the following results.

|  | Iron Microspheres (Fixed Bed) Surface Oxidized (16.6% $O_2$) +2.0% $K_2CO_3$ | | |
|---|---|---|---|
| Operation | A | B | C |
| Temperature, °F | 600 | 600 | 600 |
| Feed, $H_2/CO$ Ratio | 0.92 | 0.92 | 0.92 |
| Yields, collected: | | | |
| Oil, cc/m³ $H_2+CO$ consumed | | 114 | 114 |

*Example VI*

The catalyst prepared as described in Example V was employed in fluid bed operations. The results were as follows:

| Operation | A | B | C |
|---|---|---|---|
| Temperature, °F | 650 | 650 | 650 |
| Pressure, Lbs | 400 | 400 | 400 |
| Ratio, $H_2/CO$ | 2/1 | 2/1 | 2/1 |
| *Yield: | | | |
| Propane, plus | 227 | 240 | 243 |
| Butane, plus | 193 | 203 | 202 |

* Cc. of propane, butane and higher boiling constituents produced per m³ of $H_2$ and CO consumed.

In these operations these catalysts resisted fragmentation.

Numerous modifications of the invention not specifically disclosed herein but falling within the spirit of the invention may be made by those familiar with the art.

What is claimed is:

1. A process for the preparation of an iron catalyst comprising iron microspheres containing iron cores and oxidized coatings, wherein said oxidized coatings may have thicknesses up to about 20 microns, which comprises melting substantially pure iron, spraying molten iron predominantly in the form of substantially spherical particles substantially exclusively above 20 microns in diameter through an atmosphere comprising 5 to 60% oxygen and through a distance of from about ½ to about 3 feet and quenching the resultant sprayed material in water, whereby solid iron spheres containing relatively pure iron cores and oxidized coatings are obtained, controlling said oxygen percentage and said distance within the ranges indicated in such a manner that the thickness of said coatings is about 3–20 microns, and adding a promotional amount of a compound selected from the group consisting of the oxides and carbonates of sodium and potassium by a method selected from the class consisting of pre-coating an iron wire, impregnating during quenching and impregnating after quenching.

2. The process of claim 1 in which said compound is potassium carbonate.

3. The process of claim 1 in which said catalyst microspheres comprise up to about 21% oxygen.

4. The process of claim 1 wherein said oxidizing atmosphere comprises air.

5. The process of claim 1 wherein said iron contains less than about 0.2% carbon.

6. A process for the preparation of an iron catalyst comprising iron microspheres containing iron cores and oxidized coatings, wherein said oxidized coatings may have thicknesses up to about 20 microns, which comprises spraying substantially pure molten iron predominantly in the form of substantially spherical particles substantially exclusively above 20 microns in diameter through an atmosphere comprising 5 to 60% oxygen and through a distance of from about ½ to about 3 feet and quenching the resultant sprayed material in water, whereby solid iron spheres containing relatively pure iron cores and oxidized coatings are obtained, controlling said oxygen percentage and said distance within the ranges indicated in such a manner that the thickness of said coatings is about 3–20 microns, and adding about 2 to 4% by weight of $K_2CO_3$ to said spheres.

7. The process of claim 1 wherein said compound is incorporated into said spheres by dissolving said promotional compound in said water.

8. The process of claim 1 wherein said compound is incorporated by precoating with said promoter said iron prior to melting.

9. The process of claim 6 wherein said $K_2CO_3$ is dissolved in said water.

10. The process of claim 1 wherein said iron is in the form of iron wire.

RHEA N. WATTS.

REFERENCES CITED

The following references are of record in the file of this patent:

UNITED STATES PATENTS

| Number | Name | Date |
|---|---|---|
| 446,986 | Tilghman et al. | Feb. 24, 1891 |
| 1,695,041 | Elmen | Dec. 11, 1928 |
| 2,360,787 | Murphree | Oct. 17, 1944 |
| 2,365,720 | Neighbors | Dec. 26, 1944 |
| 2,406,864 | Thomas | Sept. 3, 1946 |
| 2,417,164 | Huber | Mar. 11, 1947 |
| 2,469,755 | Voorhies | May 10, 1949 |
| 2,476,920 | Segura | July 19, 1949 |
| 2,480,341 | Seelig | Aug. 30, 1949 |